United States Patent [19]

Cline et al.

[11] Patent Number: 4,525,858
[45] Date of Patent: Jun. 25, 1985

[54] METHOD AND APPARATUS FOR RECONSTRUCTION OF THREE-DIMENSIONAL SURFACES FROM INTERFERENCE FRINGES

[75] Inventors: Harvey E. Cline; Andrew S. Holik, both of Schenectady; William E. Lorensen, Ballston Lake, all of N.Y.

[73] Assignee: General Electric Company, Schenectady, N.Y.

[21] Appl. No.: 455,076

[22] Filed: Jan. 3, 1983

[51] Int. Cl.³ .......................... G06K 9/48; G09F 9/00
[52] U.S. Cl. .......................................... 382/1; 340/700; 340/721; 340/729; 356/2; 356/374; 356/376; 364/522; 382/22; 382/41
[58] Field of Search ............... 356/354, 355, 356, 374, 356/377, 379, 380, 386, 387, 376, 2; 382/22, 26, 9, 23, 1, 41; 364/522, 731, 518, 521, 715; 340/747, 755, 700, 729, 721; 250/558

[56] References Cited

U.S. PATENT DOCUMENTS 3,889,107  6/1975  Sutherland .......................... 364/518
4,396,903  8/1983  Habicht et al. ....................... 382/22

OTHER PUBLICATIONS

Idesawa et al., "Scanning Moiré Method and Automatic Measurement of 3-D Shapes", *Applied Optics*, vol. 16, No. 8, Aug. 1977, pp. 2152-2162.

Funnell, "Image Processing Applied to the Interactive Analysis of Interferometric Fringes", *Applied Optics*, vol. 20, No. 18, Sep. 1981, pp. 3245-3250.

Idesawa et al., "3-D Shape Input and Processing by Moirë Technique", *Proceedings 5th International Conf. on Pattern Recognition*, vol. 2, IEEE (Cat. #80CH1499-3), 1980, pp. 1085-1090.

*Primary Examiner*—Leo H. Boudreau
*Assistant Examiner*—Joseph Mancuso
*Attorney, Agent, or Firm*—Paul E. Rochford; James C. Davis, Jr.; James Magee, Jr.

[57] ABSTRACT

A fully automatic method for rapidly and unambiguously interpreting fringe patterns, including those having branched fringes, is provided. The information from the fringe patterns processed by the method of the invention can be used in testing, surface characterization and inspection applications. Further processing of the information from the two-dimensional fringe patterns yields information from which the three-dimensional surface can be quantitatively reconstructed for further use such as for display, as in microscopy, or as input for computer-aided design and computer-aided manufacture. Apparatus for conducting the method of the invention is also provided.

23 Claims, 16 Drawing Figures

METHOD AND APPARATUS FOR RECONSTRUCTION OF THREE-DIMENSIONAL SURFACES FROM INTERFERENCE FRINGES

BACKGROUND OF THE INVENTION

Interference is the property by which waves of the same frequency, but travelling in different directions, superimpose in such a manner as to give alternate regions of stationary high and low, or zero, intensities. In the case of light, if two or more light waves from different sources are superimposed, no simple description of the observed phenomenon is possible in general since the wave fluctuations are usually uncorrelated. However, if two waves from a single monochromatic point source are superimposed, the intensity of the light varies in region of superposition and, under the proper conditions, interference may be observed in the form of an interference pattern of fringes of alternating intensity. Interferometric fringe patterns are useful in engineering and science. For example, interferometers are used to quantify surface microtopography (interference microscopy) and for the measurement of refractive indices, displacements, strains, optical characteristics and fluid properties. In industrial applications, fringe patterns are useful in inspection and quality control. In such industrial applications, it would be desirable to rapidly and accurately reconstruct three-dimensional surfaces and objects from two-dimensional fringe patterns.

Several methods exist for producing fringe patterns by optical techniques. Interference patterns are produced by the use of interferometers. All interferometers divide a beam of light into two or more parts which are directed along different optical paths reflected and then recombined to form an interference pattern. In effect, interferometers measure differences in the optical path, e.g., a difference in the geometric path can be measured when the two beams travel in the same medium or a difference in the refractive index can be measured when the geometric paths are equal, but the beams travel in different media.

In the case of a two-beam interferometer, if the objects, e.g., planar mirrors, from which the two beams are reflected are perpendicular to the beams, the path lengths are equal and the media through which the beams travel are the same, the recombined light waves will constructively reinforce each other and a single bright image will be formed. If the path lengths differ by one-quarter of the wavelength ($\lambda$) of the light used, destructive interference will occur and the viewing field will appear dark. If one mirror is slightly tilted with respect to the other, a series of parallel fringes representing height differences of $\lambda/2$ will be observed. If one of the mirrors is replaced by the reflecting surface of an object to be examined, height differences present on the object will cause perturbations in the fringe pattern. By properly interpreting the interference pattern, quantitative differences in height can be determined.

Interferometers are precision measuring instruments. For example, the vertical resolution of two-beam interferometry is limited by the sinusoidal intensity distribution of the fringes. Fringe displacements of about one-fifth of a fringe spacing, which corresponds to 500 Å of vertical height, can be readily estimated visually. The use of high-contrast photography may further improve the vertical resolution of two-beam interferometry to the 100 Å range. In multiple-beam interferometry, the light reflects back and forth several times between an optical flat and the object surface. Under ideal conditions, surface displacements as small as 1/1000 of the wavelength, or 5 Å, may be detectable on highly reflective surfaces.

Interferometers are not the only devices by which useful fringe patterns may be obtained using optical techniques. Another useful but less sensitive, technique than interferometry is moire contouring. Moire contouring is particularly useful where the objects are large and the surfaces to be measured are too rough, or both, to generate suitable contour fringes by interferometry. In one moire technique, the object is illuminated through a Ronchi grating, consisting of alternate opaque and transparent lines of equal width d, by a collimated light source at an angle $\theta$ to the grating to produce an array of shadows on the object. If the object is also viewed through the grating at an angle $\theta$, the array of shadows interferes with the Ronchi grating to yield a moire pattern consisting of alternating fringes. The spacing between adjacent fringes represents a height difference h given by $h = d/(\tan \theta)$.

Another moire technique is the scanning moire method described by Idesawa et al. in *Applied Optics*, vol. 16, no. 8 (August 1977) at pages 2152–2162, the entirety of which is herein incorporated by reference, wherein the grating image is projected onto the object and the fringes are formed by electronic scanning and sampling techniques in a TV camera, thus replacing the conventional reference grating with a virtual grating.

It is often difficult to extract information from an interference or fringe pattern because there is insufficient information in the unlabelled fringe image, e.g., there is insufficient information on a single pattern to determine whether a surface feature is an elevation or depression. An interpretation may be obtained with an interferometer by slightly displacing the reference mirror of the interferometer, by changing the focus, or moving the object and then photographing another pattern. The direction of motion of the fringes may be found by comparing the two patterns. For example, as the surface is displaced toward the reference mirror, fringes of an elevation will be seen to originate at the point of maximum height and move laterally outward from that point. Alternatively, fringes contouring a depression will collapse into the region of maximum depth as the surface is displaced toward the reference mirror.

Although other techniques, such as the use of stereo pairs and double exposures, exist to aid in the interpretation of fringe patterns, the quantitative analysis of fringe patterns can be very tedious and in some cases can yield ambiguous results. Thus, there is considerable interest which has been increasing recently in automating the process of fringe analysis including the reconstruction of three-dimensional surfaces and objects from two-dimensional fringe patterns. In the case of the scanning moire method of Idesawa et al. discussed above, the pitch and rotation of the virtual grating can be varied electronically to determine the sign of the contour lines, thus rendering unnecessary the use of other techniques such as moving the object to interpret the sense of the contour lines.

Automation, however, has not as yet been able to solve some of the more complex problems associated with interference fringe and moire pattern analysis. For example, for topographical structures known as saddle points, where the principal curvatures are of the opposite sense, the contour fringes may touch and intersect. Branched fringes that touch and intersect pose particularly difficult problems to current automated systems as do fringes that end at surface discontinuities. Automation also introduces its own sources of difficulties, e.g., signal noise and lack of contrast in images processed through TV cameras.

Generally, current automated interpretation technology accommodates the above-mentioned difficulties with intersecting and touching fringes by pausing or obscuring the area of difficulty and calling for operator intervention. Funnell, in the September 1981 issue of *Applied Optics*, vol. 20, no. 18, the entirety of which is incorporated herein by reference, describes one such interactive system. Once some initial parameters are set, the described system is capable of proceeding with the analysis on its own until it determines that it has either turned back on itself, is about to try crossing another fringe or is outside a user-selected boundary, at which time it stops and asks for help from the operator. Since the trouble spots cannot be eliminated in advance or automatically compensated, this system requires virtually constant operator attention and is, therefore, not fully automatic, i.e., is only semi-automatic.

For many purposes, including inspection, robot vision, microscopy, computer-aided design (CAD), and computer aided manufacture (CAM), it would be ideal if there existed a fully automatic system which could unambiguously reconstruct the three-dimensional surface of an object from two-dimensional fringe patterns. In order to be fully automatic, such a system would have to be able to analyze touching or branching fringes.

BRIEF DESCRIPTION OF THE INVENTION

There is provided by this invention a fully automatic method for the interpretation of optical fringe patterns, such as interferograms and moire patterns, in a rapid and unambiguous manner which eliminates the need for operator intervention. Briefly described, the method encompasses the steps of transforming an optically generated two-dimensional fringe pattern representative of a three-dimensional surface to an electronic image (i.e., electrical or electronic signal), digitizing the electronic image to form an array of integers of varying value corresponding to the light intensity of the fringe pattern; thresholding the integers to produce an array of binary digits; segmenting the digitized and thresholded binary image to identify the individual fringes; detecting the edges of the individual fringes to produce an ordered set of coordinates to define contours between adjacent fringes; and sequencing the contours to yield the spatial coordinates of the three-dimensional surface.

At this stage in the method, the information obtained from the fringe pattern has been sufficiently processed to permit, for simple fringe patterns, use for a variety of purposes including comparison to a standard file of information for testing and inspection. For more complicated patterns, i.e., those having branched fringes, and to unambiguously determine the topography of unknown objects, sequencing requires a second fringe pattern. The method of the invention provides for the fully automatic analysis of the pair of fringe patterns.

The sequenced contours can further be fully automatically processed by the method of the invention to yield a polygonal, faceted three-dimensional surface representation. This polygonal representation can be displayed and manipulated using computer-aided design techniques. Further, the polygonal representation can be processed to yield a smoothed and shaded image useful, for example, in microscopy.

Apparatus for conducting the method of the invention which can, for example, automatically convert two-dimensional fringe patterns into a three-dimensional surface representation is also provided.

DETAILED DESCRIPTION OF THE INVENTION

The method of the invention begins by obtaining the electronic image of a fringe pattern by the use of a television (TV) camera. The image may be input to the TV camera directly as when, for example, the TV camera is attached directly to the eyepiece of an interference microscope. The image may also be input indirectly as when the TV camera is used to view the image from a previously made photograph of the fringe pattern. The techniques of this step are well known to those familiar with the photographic and electronic image production arts and need not be unduly elaborated upon.

As used herein, the term fringe pattern broadly encompasses images produced by the interference of optical waves. A continuous fringe pattern refers to one having no fringe(s) terminating within the boundary of the image, however, fringes ending at the boundary are not considered discontinuous. A typical boundary is shown in FIGS. 1A through 1D as boundary 11. The boundary defines the area to be processed and need not be rectangular as shown in FIGS. 1A–1D. Also, "optical" includes waves of the electromagnetic spectrum having wavelengths between about $10^{-1}$ cm to about $10^{-8}$ cm and, therefore, includes ultraviolet and infrared radiation as well as visible light. Included, therefore, and by way of example, are interferograms produced by interference microscopes (optical diffraction) and moire patterns as may be produced by illuminating and observing an object through a Ronchi grating (geometric optics). Unless made in color, the patterns will consist generally of alternating stripes or bands, i.e., fringes, with periodic or alternating variations in intensity.

The visual output of the TV camera, as may be observed on a conventional TV receiver, i.e., a monitor, or the photographic image may be manually digitized using a conventional interactive digitizing tablet to record the positions of the contour lines. By this interactive method, a series of coordinate pairs is read in for the x and y coordinates along each contour. A z coordinate for each contour is assigned to each x, y coordinate and is entered into a computer memory. The process of manual digitization is tedious, time-consuming, and subjective. Therefore, an automatic method of reading contours from a TV image is used in the method of the invention.

A digitizing TV camera having a horizontal resolution of 512 points and a vertical resolution of 512 lines has been found to provide sufficient resolution to capture the information on a typical pattern containing up to about thirty fringes. Higher resolution can be obtained with high resolution TV cameras having more than 512 points and lines. The digitizing camera in effect forms an electronic 512×512 point array of pixels or picture elements, i.e., the smallest picture elements, with each pixel having a gray scale level ranging from 0–255. In some cases the television camera and digitizer are obtained as separate units.

Figure 1A:
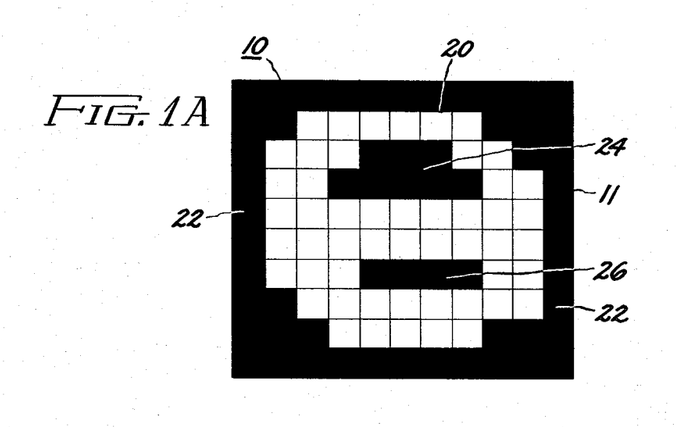
FIG. 1A shows schematically a two-dimensional fringe pattern of a simple branched structure in the form of a distorted figure eight following digitization and thresholding.

The digitized image is next processed via a technique called thresholding, whereby each pixel intensity is compared against a threshold value. If a pixel's intensity exceeds the threshold value, it is set to white. Otherwise it is set to black. A schematic of a digitized and thresholded image is shown in FIG. 1A. Image 10 consists of a 10×11 array of pixels (squares in FIG. 1A) which have been digitized and then thresholded to form four fringes. Fringes are connected pixels of the same color. Thus, one of the fringes in image 10 is fringe 20 which is formed of connected white pixels. The other three fringes (22, 24 and 26) consist of black pixels. The black pixels in each fringe 22, 24 and 26 are connected, but fringes 22, 24 and 26 are separated from each other by white fringe 20.

In the mathematical (topological) sense, image 10 of FIG. 1A contains fringe 20 which is multiconnected and branched. It is branched because one following along fringe 20 reaches at least one point where a decision must be made as to what path to follow in traversing the fringe. An annulus is an example of a multi-connected structure which is not branched as it can be traversed with a single closed curve. For images which may have noise introduced by the video digitizer, isolated white pixels in black fringes may appear. These can be removed by using a low-pass signal filter that averages pixel intensities over an area. Then the image can be thresholded again. This filtering step is not necessary for clean images but would be essential if there were significant noise. Such signal processing techniques are of common knowledge to those in the electronic arts and, therefore, are not elaborated upon in this otherwise detailed description of the invention.

Figure 1B:
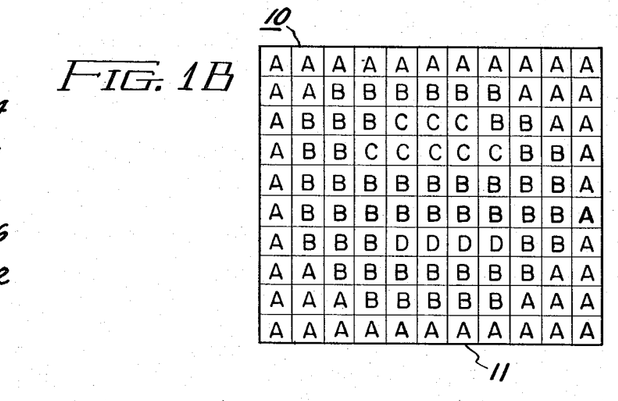
FIG. 1B shows the pattern of FIG. 1A following segmentation.

The next step of the process, segmentation, identifies individual fringes. To illustrate the procedure, the arrangement of white and black pixels of FIG. 1A, which represents a branched fringed pattern, is processed in the following manner. Starting in the upper left-hand corner, the first fringe is defined as the set of pixels that are the same color and are connected to the first pixel. Each pixel in the first fringe is labeled A as shown in FIG. 1B. To find all the pixels in the first fringe, the first pixel is used as a seed pixel in a fill algorithm. The fill algorithm tests the four neighbors of each pixel connected to the seed pixel. Each neighbor which is the same color as the seed pixel is labelled A. Each of these neighbors is recursively used as a new seed pixel. If there are MAX pixels in a row, the pixel above the i pixel is $i-MAX$, $i+MAX$ is below, $i+1$ is to the right, and $i-1$ is to the left. This fill routine tests each of the four neighbors of each pixel connected to the seed pixel i and labels the entire fringe with the new letter even if the fringe is multiply connected.

After the first fringe is labelled A, the image is scanned to find a pixel that has not been labelled, and this pixel becomes the seed of the second fringe. The second fringe is filled with the letter B. The procedure is repeated until the image is segmented into a series of labelled fringes such as the fringes labelled 20, 22, 24 and 26 in FIG. 1A. The algorithm, i.e., Segment Image, for automatically segmenting the image of black and white pixels into fringes is outlined below wherein procedure fill is the recursive fill algorithm used.

---

SEGMENT IMAGE

```
begin
for i = 1 to BUFFERSIZE
begin
  old = pixel(i);
  new = A;
  if pixel(i) = (1 or 0)
  begin
    fill(i, old, new);
    new = next letter (new);
  end;
end;
end;
procedure fill (i, old, new)
begin
if pixel(i) = old;
begin
  pixel(i) = new;
  fill(i + 1, old, new);
  fill(i − 1, old, new);
  fill(i + MAX, old, new);
  fill(i − MAX, old, new);
end;
end.
```

---

Segment image with its fill procedure, here a recursive fill procedure, is able to unambiguously label an entire fringe pattern even if there are branched fringes present. It is at this point that previous apparatus and techniques for analyzing fringe patterns either go astray improperly following the wrong fringe or stop and call for manual intervention.

The next step is to detect the edges of the fringes and produce an ordered set of coordinates defining each fringe. The location of the fringes is defined by the midpoints of the common edges between different fringes rather than the center of the fringes to give a precise description that may be quantified and easily measured. Contours are curves of constant height that define the fringe boundaries. Each fringe is bounded by one or more contours depending on whether the fringe is simply or multiply connected. Generally, if there are(n) fringes, there will be (n−1) contours. For example, with reference to FIG. 1C, the fringe composed of A pixels is bounded by border 35 of image 10 and contour 40; the fringe composed of B pixels (white fringe 20 in FIG. 1A) is bounded by contours 40, 45, and 50; while the fringe composed of C and D pixels are bounded by contours 45 and 50, respectively.

To detect the edges, the image is scanned to find the first change in the pixel label that indicates an edge. Coordinates of the midpoint between the two pixels describe first node 52 of first contour 40. The edge is followed by a tracking subroutine, here track (pixel (i)), that finds the nodes of connected pixel pairs of the same contour until all the nodes of the first contour are found. For simplicity, on FIG. 1C only some of the nodes on contour 40 are shown, i.e., even numbered nodes 52 through 74. Next the image is scanned to find the second contour, and the procedure is repeated until all the contour curves are recorded by the node coordinates. Not all the nodes are necessary to describe the contour shape; nodes that lie on straight line regions of a contour can be deleted without loss of information, i.e., only nodes where the slope of the contours change, e.g., nodes 62 and 72, are needed to specify the contour geometry.

The following algorithm, Edge Detect, containing a tracking subroutine is used in the above-described edge detection step.

---
EDGE DETECT
---
```
Procedure edge-detect
begin
for i = 1 to Buffersize
begin
if pixel(i) not equalpixel (i+1)
begin
if pixel(i) is not marked
begin
mark pixel(i);
track(pixel(i));
end;
end;
end;
end.
```
---

At this stage in the method, there is insufficient information about the fringe pattern to determine whether adjacent fringes represent increasing or decreasing surface height. The information available is in the form of a series of contours having nodes whose x and y coordinates are known. What is needed is a z coordinate for each contour. One z coordinate per contour suffices since each contour is at a constant elevation. For many simple surface shapes the fringe pattern will contain no branched fringes. Further, the elevational pattern, i.e., whether concave or convex, will be previously known or can be assumed. In these cases, the detected edges (contours) can be assigned z values, i.e., sequenced, by simply using the formula describing the height difference, h, between the contours and counting the contours assuming they are in sequence and in the order in which they were edge detected. In interferometry, for example, the equation is $h=\lambda/2$ and in moire topography the equation is $h=d/\tan\theta$ where d is the spacing of the Ronchi grating and $\theta$ is the view angle. For this simple class of surfaces, the x, y, and z coordinates of each node on each contour is now known.

At this stage, the known x, y, z coordinates of the object examined can be used for many purposes, e.g., testing and inspection. The known coordinates can be compared to the geometry of the design or standard object and if the differences between the examined and the design or standard object are within acceptable tolerance the examined object is labelled acceptable. To manually make the large number of measurements required to make the just described comparison for all but the simplest of surfaces, e.g., the surface of a cylinder, would be tedious, time consuming and expensive.

Many fringe patterns, however, are more complex and cannot be simply sequenced by the above-described sequencing step. For example, those patterns containing branched fringes and/or those whose surface elevational characteristics are unknown, and cannot be assumed, fall into this category. Thus, more information is required in order to perform the sequencing. One method to obtain the z coordinate in those cases is to change the relative distance between the object and the apparatus. After displacement, a second fringe pattern is obtained, processed by the method of the invention as described above, and compared to the first fringe pattern. In many cases the two fringe patterns can be processed in parallel. The relative motion of the fringes yields the sequence in elevation (up or down) and the elevational difference (vertical spacing) between contours. Thus, each node on each contour is now described by a set of (x, y, z) coordinates.

The sequenced contours previously obtained, which are not connected one to another, can be interconnected by a variety of means useful in computer-aided design and computer graphics. By one such technique, e.g., triangulation, the segmented contours are joined to form a polygonal (wire frame) representation of the three-dimensional surface corresponding to the surface of the object as calculated from two-dimensional fringe patterns. The MOSAIC subsystem of MOVIE.BYU, written by and available commercially from Brigham Young University, may be used to automatically triangulate singly and doubly connected fringes; however, fringes containing branches must be triangulated in an interactive mode when MOSAIC is used.

In more complicated fringes that are composed of more than two loops, i.e., branched, the N nodes of the fringe may be automatically triangulated by considering the (N−1) * N/2 possible ways of connecting N nodes. N node pairs are already connected because they make up the contour loops of the fringe. This leaves (N−3) * N/2 unconnected nodes. To do this by the method of the invention, the distance between the unconnected node pairs on contours bounding the fringe of interest are calculated, then these pairs are sorted in order of increasing distance. The shortest distance between pairs is connected provided that it does not intersect any previously connected node pair. This procedure is repeated until the list of unconnected node pairs that do not intersect any of the previously connected pairs is empty.

Figures 1C, 1D:
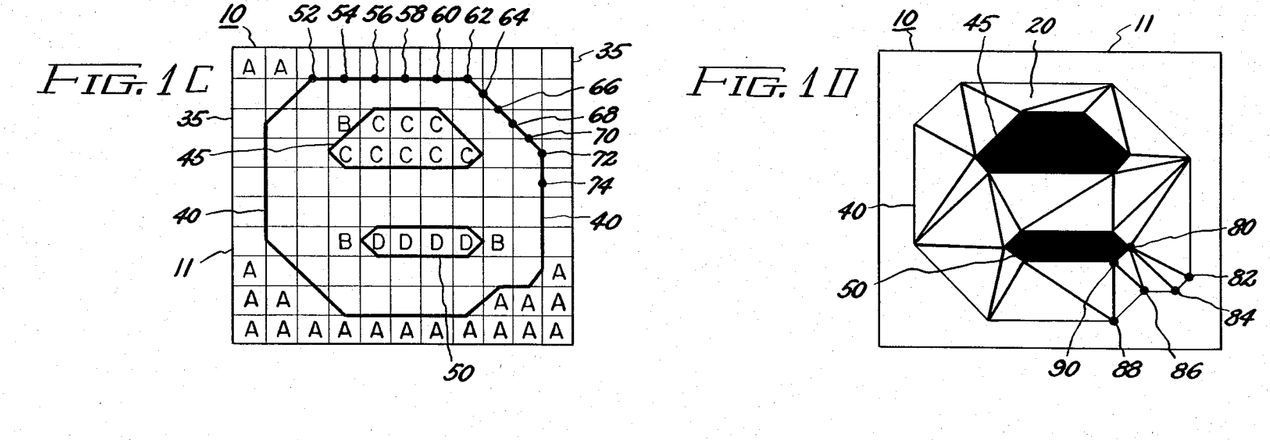
FIG. 1C shows the pattern of FIG. 1B following edge detection.
FIG. 1D shows the pattern of FIG. 1C following triangulation.

For example, from FIG. 1D, to triangulate fringe 20, all the node pairs between contours 40, 45 and 50 are calculated and listed, e.g., 90–86, 90–88, and 80–82. For simplicity in describing the process, only these nodes at vertices of the contours are shown in FIG. 1D. The node pair having the shortest distance, e.g., 90–86, is connected. This pair is removed from the list of unconnected pairs and the node pair having the next shortest distance is connected provided it does not intersect the pair 90-86. The process continues until the list is exhausted. While this procedure is not as efficient as the "stitching" algorithm used in MOSAIC, it avoids the need for manual interaction during the triangulation step.

The triangulated structure may be input into a conventional computer-aided design (CAD) system for display and CAD manipulation, e.g., rotation, scaling and translation. In addition, using the CAD system, the facets may be shaded to give a panel description and smoothed to give a realistic reconstructed view of the original surface.

The following examples are given by way of illustration, and not be way of limitation, of the novel method and apparatus herein described for the fully automatic, rapid, unambiguous processing of fringe patterns.

EXAMPLE I

Figure 2:
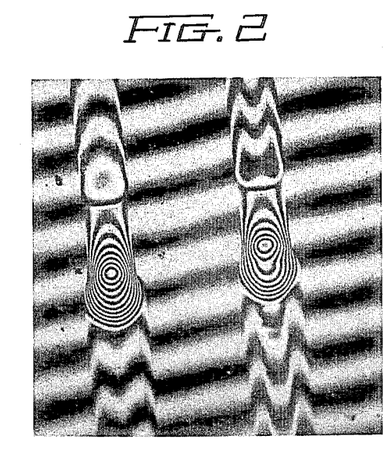
FIG. 2 is a two-dimensional interference pattern of a pair of hillocks on the surface of an InSb semiconductor wafer.

FIG. 2 is a picture of a two-beam interferogram taken with a Zeiss interference microscope having a thallium monochromatic light source of 5350.5 Å wavelength. Shown principally are a pair of hillocks, about 2 μm high by about 50 μm in diameter at their bases, on a flat InSb surface created by traversing a laser beam over the surface in separate passes to form molten tracks.

Figure 3A:
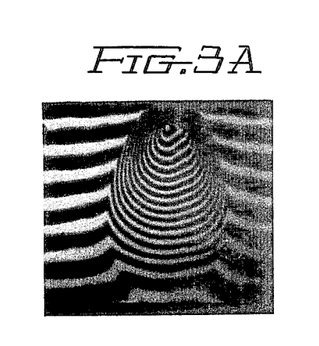
FIGS. 3A through 3D show, for a representative interference pattern of a hillock on a GaAs surface, the steps of thresholding (FIG. 3B), segmenting (FIG. 3C) and edge detection (FIG. 3D)
Figure 3B:
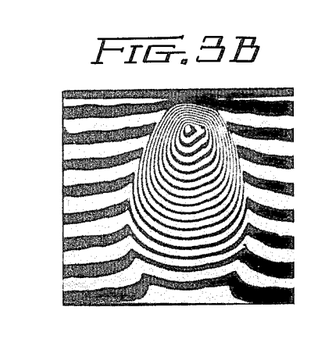

A TV camera with 512×512 resolution was used to digitize this image as a first step in the reconstruction of the surface topography. As shown in FIG. 3A for a similarly appearing hillock on a GaAs surface different from that of FIG. 2, the image was thresholded as shown in FIG. 3B to increase the fringe contrast and compress the information. Each pixel that had an intensity value greater than the threshold value was set to white, and the other pixels of low intensity were set to black. By elimination of the gray scale, the contrast was enhanced without losing the information of the fringe positions. The thresholded image, recorded with zeroes and ones, requires only one eighth of the memory than does the original gray scale image.

Figure 3C:
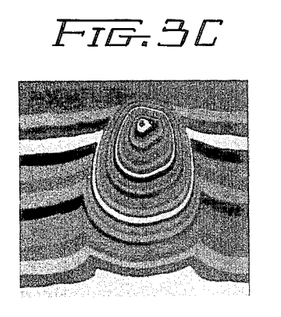

Each fringe was next segmented automatically using Segment Image described above. Each fringe was labelled with a different letter by assigning this letter to every pixel of a given fringe. The thusly segmented image is shown in FIG. 3C where, for illustrative purposes, a different gray level was assigned to each letter and, consequently, to each fringe. This procedure works for branched fringes of any degree of complexity. Each pixel was tested for connectivity to the four neighboring pixels, and the set of four-connected pixels of the same binary digit defined the fringe.

Figure 3D:
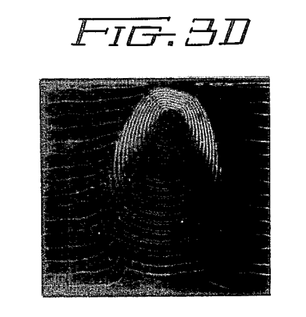

The edges of the fringes were found using Edge Detect, described above, to test adjacent pixels to determine whether they were in the same fringes. If they were in different fringes, there was a contour between the pixels. The edge detection of the image is shown in FIG. 3D wherein the contours are white lines.

Figure 4:
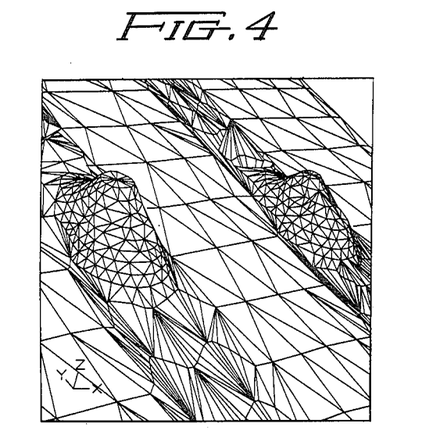
FIG. 4 shows the interference pattern of FIG. 2 following processing by the method of the invention through the step of triangulation.
Figure 5:
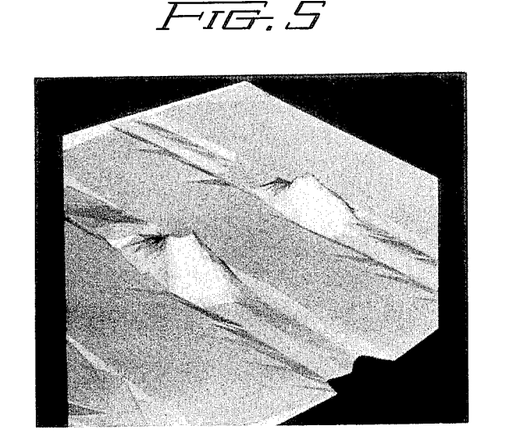
FIG. 5 shows the interference pattern of FIG. 2 following processing by the method of the invention through the steps of displaying, smoothing, and shadowing.

Next, the edge detected image corresponding to FIG. 2 was triangulated. Normally, at this step a second set of interference fringes would be required to definitely ascertain whether hills or valleys were involved. Since the structure was known to involve hills, the analysis proceeded using only the first set of interference fringes. In the case of branched fringes visible at the tops of FIGS. 3A and 3B, the triangulation was done for illustrative purposes using the interactive facilities of the MOSAIC program, although the fully automatic techniques described above are capable of triangulating this image without interaction. The heights of the hills were calculated from the fringe pattern using the formula $h=\lambda/2$. The wire frame representation of the surfaces of the hillocks was displayed on a vector terminal as shown in FIG. 4. At this stage the surface may be rotated, translated, or magnified using standard CAD/CAM software or hardware. In addition, the wire frame structure may be displayed on a raster display as a shaded surface, providing a realistic view of the surface as shown in FIG. 5.

As a further extension of the novel concepts of this invention which can be easily illustrated with this example, once the wire frame structure is obtained, a variety of geometric transformations can be performed. For example, the scale of the z axis may be exaggerated, as in FIGS. 4 and 5 by a factor of 50, to provide a greater surface relief which aids in interpreting the topography and takes advantage of the sensitivity of interferometers to small height differences. While the reconstructed surface image of FIG. 5 resembles a scanning electron microscope (SEM) image, the hillocks would look much flatter in the SEM because of the z axis exaggeration in FIGS. 4 and 5.

EXAMPLE II

Figure 6:
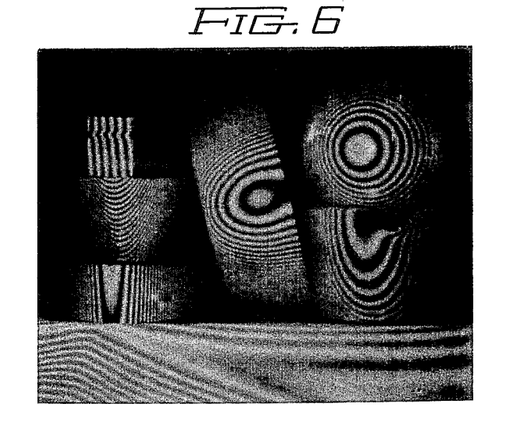
FIG. 6 is a photograph of a moire pattern of a variety of large objects.

FIG. 6 shows a photograph of a moire pattern of a variety of large white objects of various sizes and shapes. This photograph was taken using the apparatus of FIG. 7. Object 92 was illuminated by collimated light source 93 (a Kodak slide projector) through Ronchi grating 94 which consisted of a square wave grating produced on a 50-×50-cm piece of photographic film. The lines, d, of grating 94 were 125 μm wide and spaced 125 μm apart.

Figure 7:
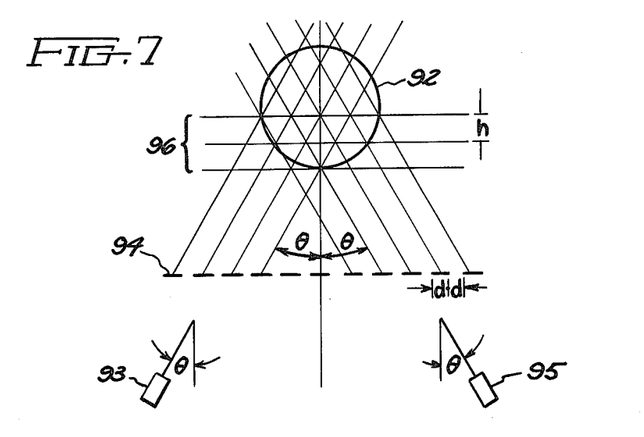
FIG. 7 is a schematic representation of the apparatus used to produce the moire pattern of FIG. 6.

Light source 94 was placed at angle θ to an axis perpendicular to grating 94. If the objects are also viewed through grating 94 at angle θ, the array of shadows interferes with the Ronchi grating to yield a moire pattern. The pattern consists of alternating white and black fringes. The loci of the intersections of the shadows cast by grating 94 on the objects and the shadow of grating 94 viewed from position 95 form a set of planes 96, spaced a distance h apart, which are the black fringes. Here, 95 was a 35 mm camera. The spacing between adjacent black or white fringes represents a height difference h given by $h=d/(\tan \theta)$.

Figure 8:
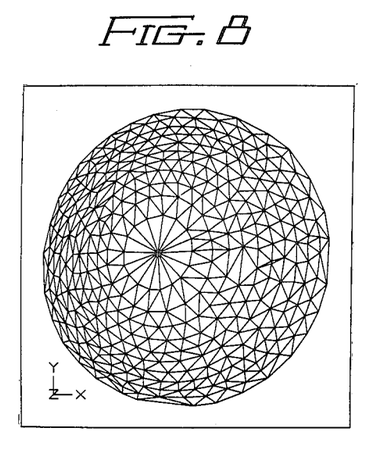
FIG. 8 shows the flask visible in the upper right-hand corner of FIG. 6 after processing by the method of the invention through the step of triangulation.
Figure 9:
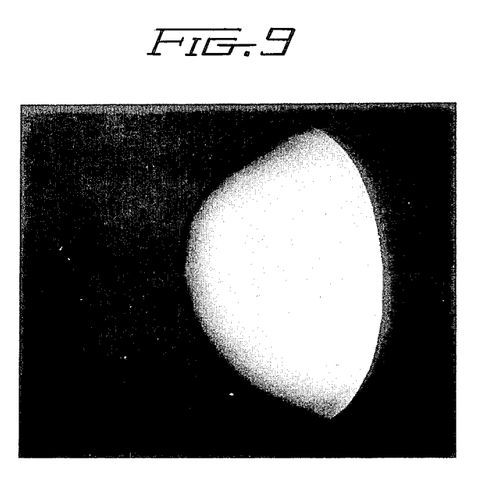
FIG. 9 shows the moire pattern of FIG. 8 following processing by the method of the invention through the steps of displaying, smoothing, and shadowing.

The 4 inch diameter spherical flask at the upper right-hand corner of FIG. 6 was selected from the different shapes and processed using the techniques of the invention as illustrated in Example I to give the wire frame geometry of FIG. 8 which resembles a geodesic dome. The reconstructed surface was rotated and smoothed to give FIG. 9. Thus, the reconstructed surface of an object may be examined in detail from different perspectives and the quantitative topography stored for future use for either design, analysis, or inspection of the object.

Figure 10:
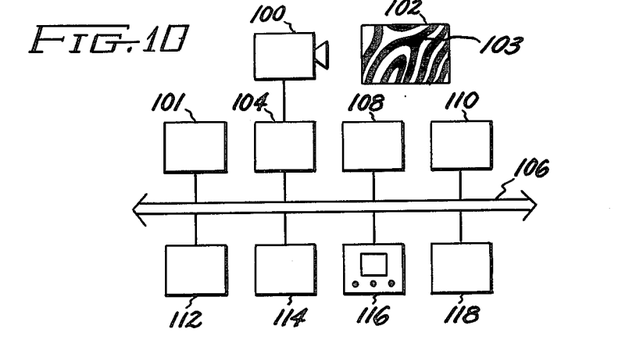
FIG. 10 is a schematic diagram of apparatus for conducting the method of the invention.

FIG. 10 shows schematically apparatus for performing the method of the invention. Camera means 100 scans fringe pattern 102, having a branch at 103, and converts the intensity distribution on pattern 102 to an electrical signal. Means 100 may be connected to view pattern 102 directly, as when means 100 is connected to the eyepiece of an interference microscope (not shown) or may view pattern 102 indirectly as when 102 is a photograph as shown in FIG. 10.

Under control of processor 101, the signal from means 100 is processed as follows. The electronic signal from means 100 is sent to means 104 for digitizing to convert the electronic image to a digitized signal. The digital signal is further converted (thresholded) by means 104 to a binary signal which is sent along bus 106 to memory 108 for storage as a first array of binary digits (1, 0) that corresponds to fringe pattern 102.

A copy of the first array of binary digits corresponding to fringe pattern 102 is sent from memory 108 to segmenting means 110 which converts the copy into a first segmented array of labelled fringes which is sent to a portion of memory 108 which is separate from the location of the first binary array.

A copy of the first binary array and a copy of the first segmented array are sent from memory 108 to edge detection means 112 which forms a list of coordinates (i, x, y) corresponding to the nodes of the i contours.

Next, processor 101 calls for a second image 102' of the same object or surface as was represented by image 102. In one hardware embodiment, processor 101 would send a signal to means (not shown) which moves the object relative to the means 100. Means 100 then transmits second image 102' for processing in the same manner as was image 102. Although described herein as a sequence of individual steps, those skilled in the art will recognize that many of the described steps may be conducted in parallel without deviation from the invention disclosed and claimed herein.

At this stage separately stored in memory 108 are first and second arrays of binary digits corresponding to images 102 and 102', respectively. Also stored in memory 108 is a first list of coordinates (i, x, y) corresponding to the nodes of the i contours of pattern 102 and a second list of coordinates (i', x', y') corresponding to the nodes of the i' coordinates of pattern 102'.

Next, processor 101 directs sequencing means 114 to compare the first array of binary digits corresponding to fringe pattern 102 with second list of coordinates (i', x', y') to determine the sequence of fringes of pattern 102 and output a list of sequenced coordinates (x, y, z) which fully describes the three-dimensional surface which was represented in the first place by two-dimensional pattern 102.

At this stage, sequenced coordinates (x, y, z) can be compared with a representation of the design surface of the object and acceptable tolerances previously stored in memory 108 and used for testing and inspection to determine whether the object represented by sequenced coordinates (x, y, z) is within specification. Thus it may readily be seen that one function of the apparatus thus far described is to view an object and output an objective decision which indicates whether an object or portion thereof, e.g., a critical surface, is within manufacturing tolerance.

Further, the apparatus of FIG. 10 can include means 116 for displaying a polygonal representation of the three-dimensional surface or a shaded and smoothed representation of the three-dimensional surface. This will be done by means, such as triangulating means 118, which connects nodes x, y, and z to each other to form a representation, a polygonal one in the case of triangulating means 118, of the three-dimensional surface. Additional means within means 118 can be used to display and manipulate, e.g., scale, rotate, and translate, the polygonal image. At this point, the displayed image is available in computer-aided design format. Additionally, other means within means 118 can be used to shade and smooth the polygonal image for visual observation of the three-dimensional surface.

While the invention has been particularly shown and described with reference to several preferred embodiments thereof, it will be understood by those skilled in the arts to which this invention pertains that various changes in form and detail may be made therein without departing from the true spirit and scope of the invention as defined by the appended claims.

What is claimed is:

1. The fully automatic method of processing a pair of optically generated two-dimensional continuous, branched fringe patterns representative of a three-dimensional surface comprising the steps of:

A. transforming a pair of optically generated two-dimensional fringe patterns into first and second electronic images, said pair of fringe patterns representing the same three-dimensional surface, but containing sufficient information to permit the topography of said three-dimensional surface to be determined therefrom;
   B. digitizing the first and second electronic images to form first and second arrays of integers;
   C. thresholding the digitized images to transform the integers of the first and second arrays to either the digit one or the digit zero;
   D. segmenting electronically the thresholded images to define first and second sets of fringes;
   E. detecting electronically the edges of the fringes of the first and second sets of fringes to define first and second sets of contours; and
   F. sequencing electronically the first set of contours by comparing the second set of contours to the first set of fringes to determine the spatial coordinates of the three-dimensional surface.

2. The method of claim 1 further including the steps of:

(i) following the sequencing step, selecting the contours defining a fringe, each contour being defined by a set of nodes;
   (ii) calculating the distances between unconnected node pairs and listing in order of increasing distance; and
   (iii) connecting said node pairs beginning with the node pair having the shortest distance and progressing through said list connecting node pairs of increasing length excluding those node pairs that would intersect previously connected node pairs or contours until all possible eligible unconnected node pairs are connected to form a triangulated polygonal representation of the three-dimensional surface.

3. The method of claim 1 wherein said optically generated fringe pattern is a moire fringe pattern.

4. The method of claim 1 wherein said optically generated fringe pattern is an interferometric fringe pattern.

5. The method of claim 1 wherein said segmenting step is accomplished by individually scanning the digitized and thresholded images and for each image collecting sets of connected elements of each array having the same binary value to define a plurality of fringes and labelling each fringe.

6. The method of claim 1 wherein said detecting step is accomplished by individually scanning the segmented images of the first and second sets of fringes to locate the first node occurring between adjacent elements having different fringe labels and tracking the boundary between adjacent nodes occurring between the same fringes to form a first labelled contour and repeating said locating and tracking steps until all nodes of the first and second sets of fringes are collected into labelled contours.

7. The method of claim 1 further including the step of comparing the spatial coordinates found by said sequencing step with the known design geometry and design tolerance to quantitatively determine whether the three-dimensional surface is within design specification.

8. The method of claim 2 further including the steps of displaying, smoothing and shading the triangulated polygonal representation of the three-dimensional surface.

9. Apparatus for fully automatically processing a pair of optically generated two-dimensional continuous, branched fringe patterns representative of a three-dimensional surface comprising:

A. means for transforming a pair of optically generated two-dimensional fringe patterns into first and second electronic images, said pair of fringe patterns representing the same three-dimensional surface, but containing sufficient information to permit the topography of said three-dimensional surface to be determined therefrom;
   B. means for digitizing the first and second electronic images to form first and second arrays of integers;
   C. means for thresholding the digitized images to transform the integers of the first and second arrays to either the digit one or the digit zero;
   D. means for segmenting electronically the thresholded images to define first and second sets of fringes;
   E. means for detecting electronically the edges of the fringes of the first and second sets of fringes to define first and second sets of contours;
   F. means for sequencing electronically the first set of contours by comparing the second set of contours to the first set of fringes to determine the spatial coordinates of the three-dimensional surface; and
   G. bus means for interconnecting said means for transforming, digitizing, thresholding, segmenting, detecting and sequencing.

10. The apparatus of claim 9 further including triangulating means, connected to said bus means, including:
   (i) means for obtaining from the sequencing means the contours defining a fringe, each contour being defined by a set of nodes;
   (ii) means for calculating the distances between unconnected node pairs and listing in order of increasing distance; and
   (iii) means for connecting said node pairs beginning with the node pair having the shortest distance and progressing through said list connecting node pairs of increasing length excluding those node pairs that would intersect previously connected node pairs or contours until all possible eligible unconnected node pairs are connected to form a triangulated polygonal representation of the three-dimensional surface.

11. The apparatus of claim 9 further including means, connected to said bus means, for displaying, smoothing and shading the triangulated polygonal representation of the three-dimensional surface.

12. The apparatus of claim 9 wherein said optically generated fringe pattern is a moire fringe pattern.

13. The apparatus of claim 9 wherein said optically generated fringe pattern is an interferometric fringe pattern.

14. The apparatus of claim 9 wherein said means for segmenting comprise means for individually scanning the digitized and thresholded images and means for individually collecting for each image sets of connected elements of each array having the same binary value to define a plurality of fringes and labelling each fringe.

15. The apparatus of claim 9 wherein said detecting means comprise means for individually scanning the segmented images of the first and second sets of fringes to locate the first node occurring between adjacent elements having different fringe labels, means for tracking the boundary between adjacent nodes occurring between the same fringes to form a first labelled contour and means for repeating said scanning and tracking means until all nodes of the first and second sets of fringes are collected into labelled contours.

16. The apparatus of claim 9 further including means, connected to said bus means, for comparing the spatial coordinates found by said sequencing means with the known design geometry and design tolerance to quantitatively determine whether the three-dimensional surface is within design specification.

17. A computer-aided interference device for fully automatically producing a displayed, shaded, smoothed and manipulatable quantitative representation of a three-dimensional surface from a pair of optically generated two-dimensional fringe patterns comprising:

(A) means for transforming a pair of optically generated two-dimensional fringe patterns into first and second electronic images, said pair of fringe patterns representing the same three-dimensional surface, but containing sufficient information to permit the topography of said three-dimensional surface to be determined therefrom;
   (B) means for digitizing the first and second electronic images to form first and second arrays of integers;
   (C) means for thresholding the digitized images to transform the integers of the first and second arrays to either the digit one or the digit zero;
   (D) means for segmenting electronically the thresholded images to define first and second sets of fringes;
   (E) means for detecting electronically the edges of the fringes of the first and second sets of fringes to define first and second sets of contours;
   (F) means for sequencing electronically the first set of contours by comparing the second set of contours to the first set of fringes to determine the spatial coordinates of the three-dimensional surface;
   (G) triangulating means including:
      (a) means for obtaining from the sequencing means the contours defining a fringe, each contour being defined by a set of nodes;
      (b) means for calculating the distances between unconnected node pairs and listing in order of increasing distance; and
      (c) means for connecting said node pairs beginning with the node pair having the shortest distance and progressing through said list connecting node pairs of increasing length excluding those node pairs that would intersect previously connected node pairs or contours until all possible eligible unconnected node pairs are connected to form a triangulated polygonal representation of the three-dimensional surface;

(H) visualizing means including means for displaying, smoothing, shading, and manipulating the triangulated polygonal representation of the three-dimensional surface; and (I) bus means for interconnecting said means for transforming, digitizing, thresholding, segmenting, detecting, sequencing, triangulating, and visualizing.

18. The apparatus of claim 17 wherein said means for transforming and said means for digitizing comprise, in combination, a digitizing television camera.

19. The apparatus of claim 17 wherein said optically generated fringe pattern is a moire fringe pattern.

20. The apparatus of claim 17 wherein said optically generated fringe pattern is an interferometric fringe pattern.

21. The apparatus of claim 17 wherein said means for segmenting comprise means for individually scanning the digitized and thresholded images and means for individually collecting for each image sets of connected elements of each array having the same binary value to define a plurality of fringes and labelling each fringe.

22. The apparatus of claim 21 wherein said means for individually segmenting the digitized and thresholded images comprise means for selecting a seed element of the binary image and:

(i) means for setting current label to first label;

(ii) means for collecting all connected elements of the array having the same binary value as said seed element and labelling said collected elements with current label forming thereby a fringe of the current label;

(iii) means for changing current label to next label;

(iv) means for selecting the next unlabelled element and setting the seed element equal to this next unlabelled element; and (v) means for repeating means (ii), (iii), and (iv) sequentially until there are no unlabelled elements forming thereby a plurality of labelled fringes.

23. The apparatus of claim 17 further including means, connected to said bus means, for comparing the spatial coordinates found by said sequencing means with the known design geometry and design tolerance to quantitatively determine whether the three-dimensional surface is within design specification.

* * * * *